United States Patent [19]

Teti

[11] 4,041,799

[45] Aug. 16, 1977

[54] POWER ACTUATED LAZY-TONGS ARRANGEMENT

[76] Inventor: John J. Teti, P.O. Box 756, Saltville, Va. 24370

[21] Appl. No.: 620,287

[22] Filed: Oct. 7, 1975

[51] Int. Cl.² ............................................ G05G 1/04
[52] U.S. Cl. .................. 74/521; 214/146 E; 214/514; 214/82; 254/122
[58] Field of Search ......... 74/521; 214/131 R, 146 E, 214/146 R, 767, 82, 514; 254/122

[56] References Cited

U.S. PATENT DOCUMENTS

| | | | |
|---|---|---|---|
| 2,176,636 | 10/1939 | Meacham | 74/521 X |
| 2,670,867 | 3/1954 | Thompson | 214/514 |
| 3,106,723 | 10/1963 | Carpenter | 254/122 X |
| 3,700,070 | 10/1972 | King | 254/122 X |
| 3,788,507 | 1/1974 | Voss | 214/146 E |
| 3,885,692 | 5/1975 | Anderson, Jr. | 214/514 |

Primary Examiner—Samuel Scott
Assistant Examiner—Randall Heald
Attorney, Agent, or Firm—Bacon & Thomas

[57] ABSTRACT

The mounting ends of one superimposed pair of base legs of a lazy-tongs arrangement are pivoted to fixed brackets, and the mounting ends of the other superimposed pair of base legs are mounted for both pivotal movement, and sliding movement relative to the fixed pivot brackets. The opposite ends of a bridge means are each connected with one superimposed pair of the base legs at a point between the mounting ends thereof and the scissors pivot pins connecting the central portions of the base legs, and the central portion of the bridge means is connected to the outer end of the power piston of a hydraulic cylinder. When the hydraulic cylinder is activated to move the power piston outwardly, the bridge means acts to exert force simultaneously on both superimposed pairs of base legs to thereby forcefully extend the lazy-tongs arrangement.

12 Claims, 7 Drawing Figures

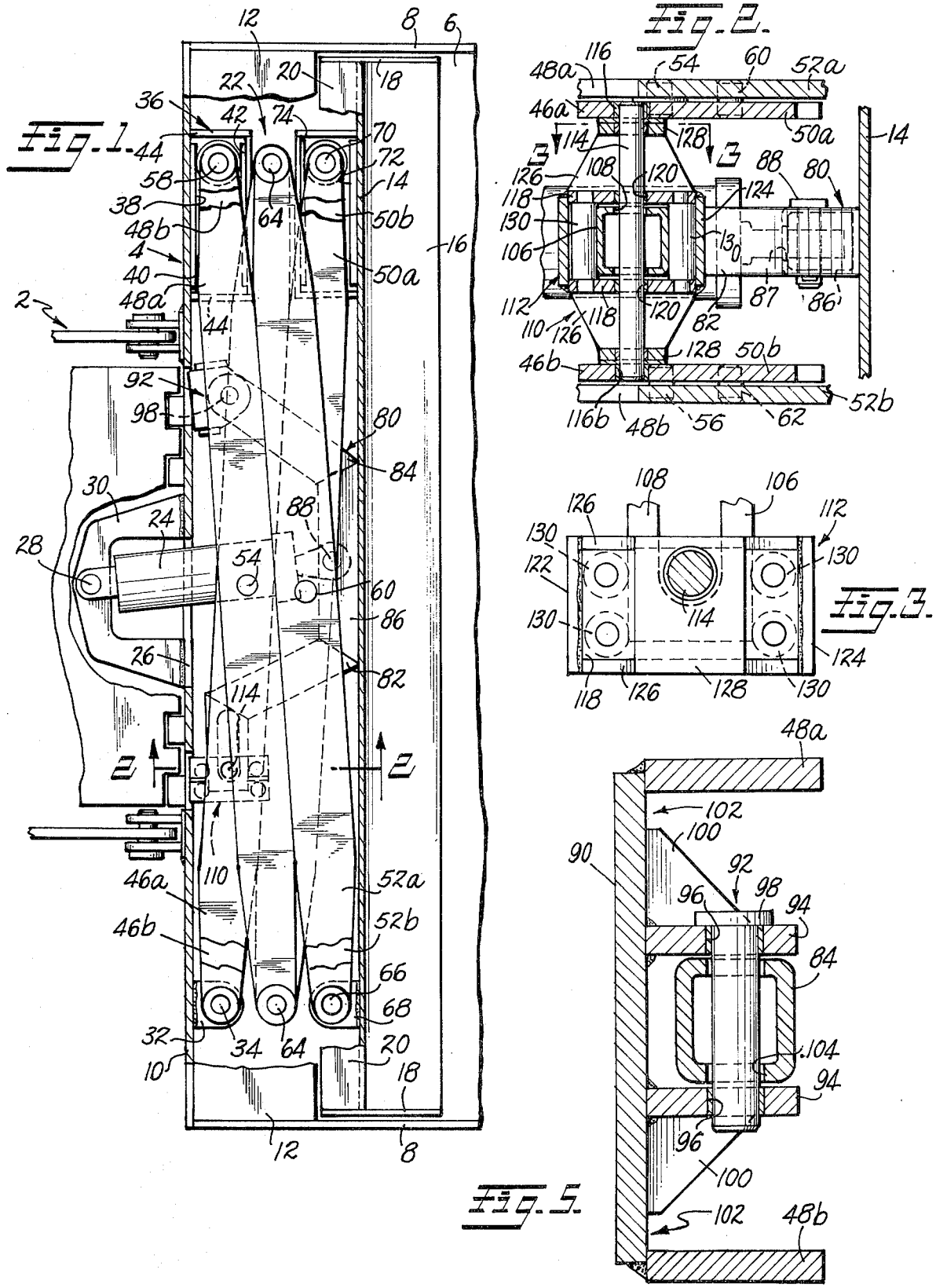

POWER ACTUATED LAZY-TONGS ARRANGEMENT

BACKGROUND OF THE INVENTION

1. Field of the Invention

The present invention related generally to devices commonly referred to as lazy-tongs. More specifically, it relates to lazy-tong devices utilized to positively drive a scraper blade or other movable member away from a relatively fixed base member, and in particular to a unique bridge means for transferring power to both of the base leg means of a lazy-tongs arrangement from a hydraulic piston, so as to obtain even and positive forceful action from the arrangement.

2. Description of the Prio Art

A lazy-tongs device is made up of a plurality of legs of substantially equal length, arranged in crossed-over pairs that are pivoted scissors-like to each other centrally thereof, the outer ends of each crossed-over pair of legs being pivotally connected to the outer ends of the next pair. Such lazy-tongs devices have long been known, and provide a substantial degree of movement in an axial direction along the aligned scissor pivots, for a relatively small movement of the outer ends of the base legs of the lazy-tongs toward each other.

The lazy-tongs concept has many uses, one being to transmit power in an axial direction. There have been several arrangements proposed for this purpose, such as those shown in U.S. Pat. Nos. 1,984,766; 2,706,102; 3,032,319; and 3,228,659. While the lazy-tongs devices of each of these patents are effective for their intended purpose, in each case power is effectively applied to only one of the base legs of the device. This limits the amount of force that can be applied, and also places a large strain on the powered leg over the other leg of the lazy-tongs device.

The applicant has found that a lazy-tongs can be a more effective force transfer mechanism if both of the base leg means thereof have force applied thereto, and if the force is equally and simultaneously applied to the two base leg means. No arrangement for effectively doing such has heretofore been known, however. The applicant has devised a unique arrangement for evenly applying force simultaneously to both base leg means, while at the same time accommodating the converging movement of the base legs toward each other that occurs upon extension of the lazy-tongs. The present invention, therefore, is an improvement over previously known lazy-tongs devices utilized to transfer and apply force, and produces superior results over such conventional lazy-tongs devices.

SUMMARY OF THE INVENTION

The lazy-tongs arrangement of the invention is particularly designed for use in a mining machine, to move a scraper blade forwardly and backwardly within a scoop for discharging material therefrom. To be truly effective for this purpose, the lazy-tongs arrangement must be capable of a large transfer of force from a hydraulic cylinder or like power element, and that force must be applied evenly to the opposite ends of the scraper blade. The arrangement of the invention is designed to so function.

While the lazy-tongs arrangement of the invention has been particularly designed for moving a scraper blade, it is to be understood that it can be used in a variety of other mechanisms and environments as well.

The arrangement of the invention utilizes two pairs of base legs. One base leg from each pair is crossed over the corresponding leg from the other pair, and such are connected by a pivot pin to form a scissors-like "X" arrangement. Two such X like units are formed from the two pairs of base legs, and such are superimposed over each other to form a pair of spaced, parallel X like units that define the first or base section of the lazy-tongs arrangement. Two additional X like units made up of two pairs of outer legs form a second section of the lazy-tongs, and are pivotally connected to the units of the first section.

The mounting ends of one superimposed pair of the base legs are respectively pivoted by pins to a first pair of base brackets mounted on a relatively fixed base member, and the mounting ends of the second or other superimposed pair of base legs carry a pivot shaft therebetween that is received in a slot in one of a second pair of base mounting brackets also attached to the fixed base member. The slot of the second base bracket is axially aligned with the pivot pins carried by the first base brackets, so that the pivot shaft is slidable toward and away from said pivot pins.

Turning to the opposite or outer end of the lazy-tongs, the mounting ends of the superimposed pair of outer legs that lie on the same side of the tongs as the first superimposed pair of base legs are respectively connected by pivot pins to a first pair of outer brackets carried by the scraper blade or other relatively movable member. The ends of the second or other superimposed pair of outer legs carry a pivot shaft that is received in a second, slotted outer mounting bracket also carried on the relatively movable member. Thus, the opposite ends of the lazy-tongs are similarly mounted.

With the arrangement described, it is seen that when the pivot shaft carried by the second superimposed pair of base legs is moved within its slot toward the first pair of base brackets, the lazy-tongs will be extended and the relatively movable member will be urged to move away from the relatively fixed base member. During such extension the legs of each section of the lazy-tongs will converge towards each other, in the manner of a closing scissors. Movement of the pivot shaft in the opposite direction will, of course, collapse the lazy-tongs.

In order to effect extension and collapse of the lazy-tongs, a bridge means is provided and has its opposite ends connected between the two superimposed pairs of base legs at a point between the mounting ends thereof and their scissor pivots. A hydraulic cylinder is mounted in general alignment with the longitudinal, or extension-collapse, axis of the lazy-tongs, and the outer end of the power piston thereof is pivotally connected to the central portion of the bridge means. When the power piston is moved axially outwardly of the lazy-tongs, the bridge means is designed to be effective in simultaneously and equally applying force to both superimposed pairs of the base legs, causing them to close in a scissors-like movement and thereby extending the lazy-tongs.

It is important to appreciate that as the lazy-tongs is progressively extended, the mounting ends of the two superimposed pairs of base legs must move progressively toward each other. This movement must be accommodated by the bridge means if such is to properly function for equally and simultaneously applying force to the base legs, and the bridge means of the invention is uniquely designed for this purpose.

Actually, two different embodiments of the bridge means are contemplated by the invention. If the first embodiment, the bridge means comprises a bowed rigid bridge element, one end of which is connected to a fixed pivot pin carried by one superimposed pair of the base leg between the scissors-pivot and the mounting end thereof. The other superimposed pair of base legs carries a fixture thereon positioned between the scissors-pivot and the mounting ends thereof, and which mounts a pivot shaft that is received within a slot in the other end of the rigid bridge element. The outer end of the power shaft is pivoted to the center of the rigid bridge element. The rigid bridge pivot shaft and its slot are effective to accommodate the converging movement of the two superimposed pairs of base legs during extension of the lazy-tongs, but at the same time the rigid bridge element is effective to apply force evenly and simultaneously to the base legs.

In the second embodiment of the bridging means, the means comprises a pair of bridge arms pivotally connected at one end by a pivot rod, which rod also connects the bridge arms with the outer end of the power piston. The other ends of the bridge arms are each connected by a pivot pin to one superimposed pair of the base legs, at a point thereon between the scissors-pivot and the mounting ends thereof. The bridge arms are effective both to accommodate the convergence of the superimposed pairs of base legs of the lazy-tongs during extension thereof, and at the same time to ensure and equal application of force simultaneously to the base legs.

In both embodiments of the invention the hydraulic cylinder is pivotally mounted, to accommodate the progressive lateral shifting of the bridge means during extension and collapse of the lazy-tongs. It is of course to be understood that some other power element could be substituted for the hydraulic cylinder to operate the lazy-tongs, such as a crank shaft.

It is the principal object of the invention to provide a powered lazy-tongs arrangement, wherein force is simultaneously and evenly applied to both of the base leg means of the lazy-tongs to effect extension and/or collapse thereof.

Another object is to provide a lazy-tongs arrangement whereby a balanced and controlled transfer of power can be effected between a fixed base member and a relatively movable member, without distorting or damaging the lazy-tongs.

A further object is to provide a bridging means for applying force equally to both base leg means of a lazy-tongs device, designed to accommodate the scissors-like converging and diverging movements of said base leg means occurring during operation ofthe lazy-tongs.

Other objects and many of the attendant advantages of the invention will become readily apparent from the following Description of the Preferred Embodiments, when taken in conjunction with the accompanying drawings.

BRIEF DESCRIPTION OF THE DRAWINGS

FIG. 1 is a fragmentary plan view of a power scoop having a movable scraper blade therein, and showing the powered lazy-tongs arrangement of the first embodiment of the invention in a collapsed condition between the relatively fixed back wall of the power scoop and the relatively movable scrapper blade;

FIG. 2 is an enlarged fragmentary vertical sectional view, taken on the line 2—2 of FIG. 1, through the collapsed lazy-tongs arrangement, and showing in particular the fixture for slidably mounting one end of the rigid bridge element;

FIG. 3 is a fragmentary horizontal sectional view, taken on the line 3—3 of FIG. 2, and showing in detail how the said one end of the rigid bridge element is slidably mounted;

FIG. 5 is an enlarged vertical sectional view, taken on the line 5—5 of FIG. 4, and showing the fixed pivot arrangement for mounting the other end of the rigid bridge element;

DESCRIPTION OF THE PREFERRED EMBODIMENTS

Figure 4:
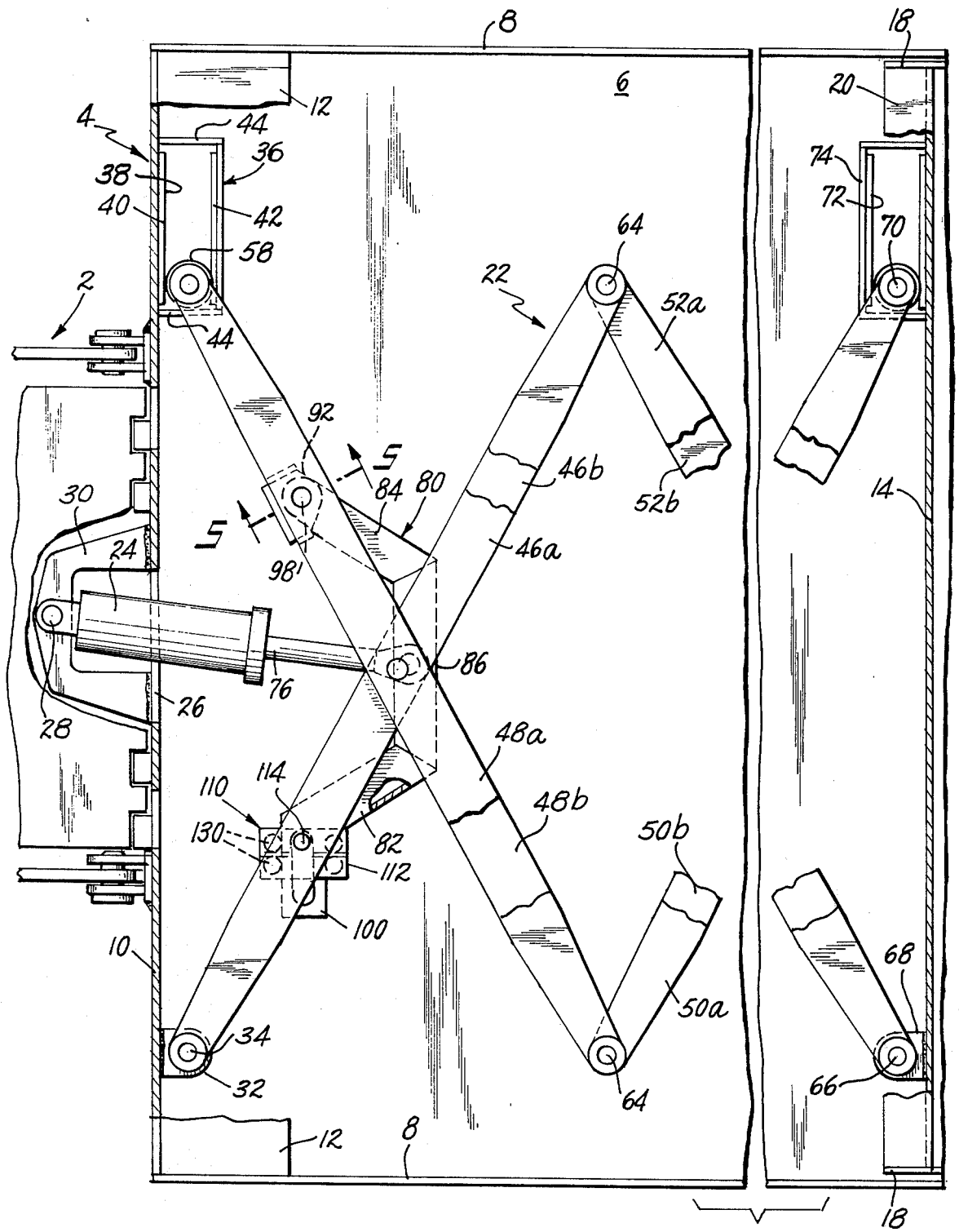
FIG. 4 is a plan view similar to FIG. 1, but showing the lazy-tongs arrangement of the invention in an extended position.

Referring now to FIGS. 1-5 of the drawings, a mining machine is indicated generally at 2, and is provided with a power scoop 4 comprising a bottom wall 6, a pair of side walls 8, and a rear wall 10, the rear portion of the scoop 4 having a short top wall 12 thereon. Received within the power scoop 4 is a scraper blade 14 that is movable relative to the scoop base or rear wall 10, and which has a bottom scraper plate 16 thereon that is braced by side brace plates 18. The side brace plates 18 extend rearwardly of the scraper blade 14, and are welded to a rearward extension of the plate 16. Rigidity is added to the scraper blade assembly by a top transverse brace plate 20, also welded in place.

Positioned between the movable scraper blade 14 and the relatively fixed base or rear wall 10 is the lazy-tongs arrangement of the invention, indicated generally at 22, and designed to forcefully move the scraper blade 14 forwardly in the scoop 4 to empty material that has been gathered therein. The lazy-tongs arrangement 22 is operated by a hydraulic cylinder 24 which extends through an opening 26 cut in the rear scoop wall 10, the base end of the hydraulic cylinder 24 being pivotally connected by a pin 28 to a bracket 30 secured to the rear face of the rear scoop wall 10, and the hydraulic cylinder being mounted for pivotal movement in the plane of the lazy-tongarrangement 22.

The rear or base wall 10 of the scoop 4 has a first vertically-spaced pair of base mounting brackets 32 thereon, which carry fixed pivot pins 34. A second base mounting bracket 36 is mounted on the base wall 10 horizontally spaced from the brackets 32. The second base bracket 36 includes an elongated slot 38 defined by a bottom track 40, a parallel top track 42, and end walls 44, and the longitudinal axis of the slots 38 is in alignment with the pivot pins 34. The base mounting brackets 32 and 36 function to anchor the base end of the lazy-tongs 22.

The lazy-tongs 22 is comprised of two scissors-like sections, a base section and an outer section. The base section comprises a first superimposed pair of base legs 46a and 46b, and a second pair of superimposed base legs 48a and 48b. Similarly, the outer section of the tongs comprises a first superimposed pair of outer legs 50a and 50b, and a second pair of superimposed outer legs 52a and 52b. The base legs 46a and 48a are crossed-over and connected by a pivot pin 54 centrally thereof, and the base legs 46b and 48b are similarly connected by a scissors pivot pin 56. The mounting ends of the first superimposed pair of base legs 46a and 46b are pivoted on the fixed pivot pins 34, whereas the mounting ends of the second superimposed pair of base legs 48a and 48b carry a pivot shaft 58 that is received in the slot 38 of the second base mounting bracket 36. Thus, it is seen that the first superimposed pair of base legs 46a and 46b and the second superimposed pair of base legs 48a and 48b form two superimposed, parallel X like units attached at their mounting ends to the rear or base plate 10, and which act in concert as the base section of the lazy-tongs 22.

Turning to the outer section of the tongs, the outer legs 50a and 52a are crossed-over and connected by pivot pins 60 centrally thereof, and the outer legs 50b and 52b are similarly crossed-over and connected by a pivot pin 62. The juxtaposed ends of the legs 48a and 50a are overlapped and connected by a connector pivot pin 64, an similar connector pivot pins 64 serve to connect the juxtaposed and overlapped ends of the legs 48b and 50b, 46a and 52a, and 46b and 52b. The mounting ends of the superimposed pair of outer legs 52a and 52b are secured by fixed pivot pins 66 to first outer brackets 68 carried by the scraper blade 14, and the mounting ends of the other superimposed pair of outer legs 50a and 50b carry a pivot shaft 70 that is received in the slot 72 of the second outer bracket 74 mounted on the scraper blade. The bracket 74 is constructed like the bracket 36, and the slot 72 therein is aligned with the fixed pivot pins 66.

From comparing FIGS. 1 and 4, it is seen that when the pivot shaft 58 is moved toward the pivot pins 34, the lazy-tongs apparatus 22 will be extended. In the invention such extension of the apparatus 22 is forcefully caused by the hydraulic cylinder 24, or an equivalent force producing means, which acts on the base legs of the lazy-tongs apparatus through a bridge means connected between said base legs and operated by the power piston 76 of the hydraulic cylinder.

The bridge means in FIGS. 1-5 comprises a rigid bridge element 80 having a hollow, rectangular cross-section, and which includes a pair of angled portions 82 and 84 that are connected at their converging ends by a straight cross-bar 86 to form a generally bowed element. The central portion of the cross-bar 86 on the inner side of the bow has an opening 87 therein for receiving the outer end of the power piston 76, and such is pivotally secured to the rigid bridge element 80 by a pivot pin 88.

The superimposed pair of base legs 48a and 48b have a mounting plate 90 welded therebetween about midway between the scissors pivot pins 54 and 56 and the mounting ends thereof that carry the pivot shaft 58. A bracket 92 is mounted on the plate 90 between the legs 48a and 48b, and comprises a pair of parallel plates 94 having aligned bores 96 therein for receiving a pivot pin 98, the parallel plates 94 being braced by triangular gusset plates 100. The gusset plates 100 terminate inwardly from the base legs 48a and 48b to leave spaces 102 therebetween, so that the base legs 46a and 46b received within the base legs 48a and 48b can be accommodated when the lazy-tongs 22 is collapsed.

The end of the angled portions 84 of the rigid bridge element 80 has a transverse bore 104 therethrough, for receiving the pivot pin 98. Thus, one end of the rigid bridge element 80 is pivotally connected to the superimposed pair of base legs 48a and 48b.

The angled 82 of the rigid bridge element 80 has a straight end portion 106 thereon that lies parallel with the central portion 86 of the element, and which has an elongated transverse slot 108 therein. The end portion 106 is received within a fixture 110 mounted between the superimposed pair of base legs 46a and 46b, and functions both to transmit force to said base legs, and to accommodate the converging movement of the base legs that occurs during extension of the lazy-tongs.

The fixture 110 comprises a rectangular cage 112 that is mounted between the base legs 46a and 46b about midway between the scissors pivot pins 54 and 56 and the mounting ends of said legs, the cage being supported on a pivot shaft 114 that has its opposite ends seated in bores 116a and 116 b in the base legs 46a and 46b, respectively. The cage 112 includes sidewalls 118 with bores 120 therein through which the shaft 114 passes, and top and bottom walls 122 and 124. Spacer plates 126 are welded to the sidewalls 118, and carry bearings 128 on their outer ends that receive the pivot shaft 114.

The end portion 106 of the rigid bridge element 80 is telescopically received within the cage 112, with the pivot shaft 114 passing through the slot 108. Mounted above and below the end portion 106 and carried by the cage sidewalls 118 are bearing rollers 130, which function to both ensure free sliding motion of the bridge element 80, and to help transfer force from the fixture 110 to the pivot shaft 114 and hence the base legs 46a and 46b.

It is believed that the manner in which the embodiment of the invention shown in FIGS. 1-5 functions will be obvious. Initially, assume that the lazy-tongs apparatus 22 is in its collapsed position, as shown in FIG. 1. Under such circumstances, the power piston 76 will be telescoped within the hydraulic piston 24.

When the hydraulic piston 24 is activated to force the power piston 76 to move outwardly, such will exert a pulling force on the rigid bridge element 80, which in turn will apply force simultaneously and equally to both superimposed sets of base legs 46a and 46b, and 48a and 48b, through the pivot shaft 114 and the pivot pin 98, respectively. The force thus exerted on the base legs will result in movement of the pivot shaft 58 within its slot 38 toward the fixed pivot pins 34, causing the lazy-tongs assembly 22 to extend. Such extension will continue while the power piston 76 is moving outwardly, over the length permitted by the length of the slots 38 and 72. The results will be a positive and even application of force to the opposite ends of the scraper blade 14, causing such to move outwardly relative to the rear or base plate 10.

It is apparent that movement of the power piston 76 in the opposite direction will effect collapse of the extended lazy-tongs.

During both expansion and collapse of the lazy-tongs 22, the central portion 86 of the rigid bridge element 80 will shift laterally at a pace related to the expansion or collapsing movement. It is to accommodate this shifting that the hydraulic cylinder 24 is pivotally mounted at both ends thereof. It is thus seen that the unique bridge means of FIGS. 1-5 permits the simultaneous and equal application of force to the base legs of the lazy-tongs arrangement 22, and at the same time that such accommodates the converging and diverging scissors-like action of such base legs occurring during extension and collapse of the lazy-tongs. Thus, the arrangement of FIGS. 1-5 fully satisfies the objects stated for the present invention.

Figure 6:
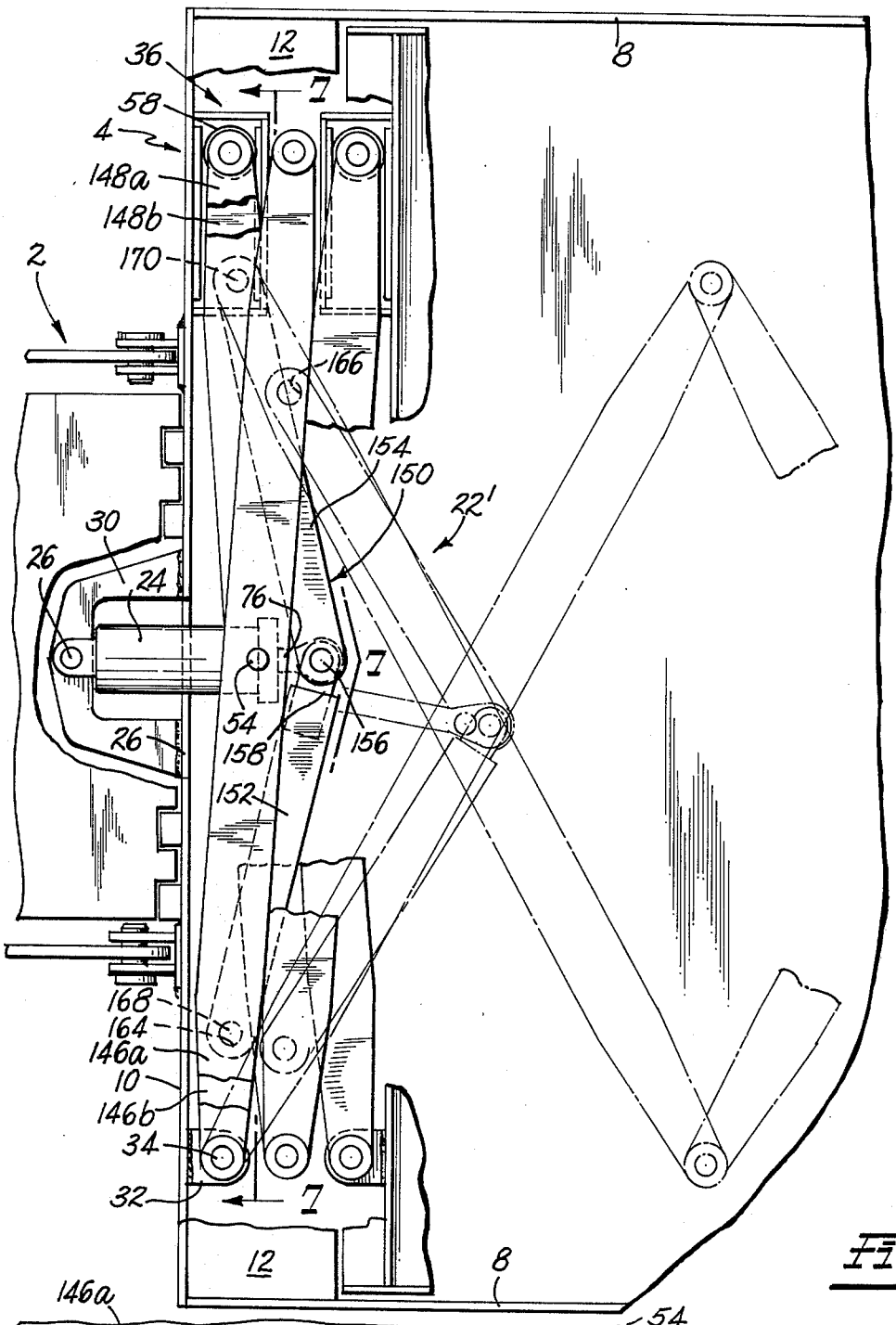
FIG. 6 is a plan view similar to FIG. 1, but showing a second embodiment of the lazy-tongs arrangement of the invention, wherein the bridge means is comprised of a pair of connected bridge arms.
Figure 7:
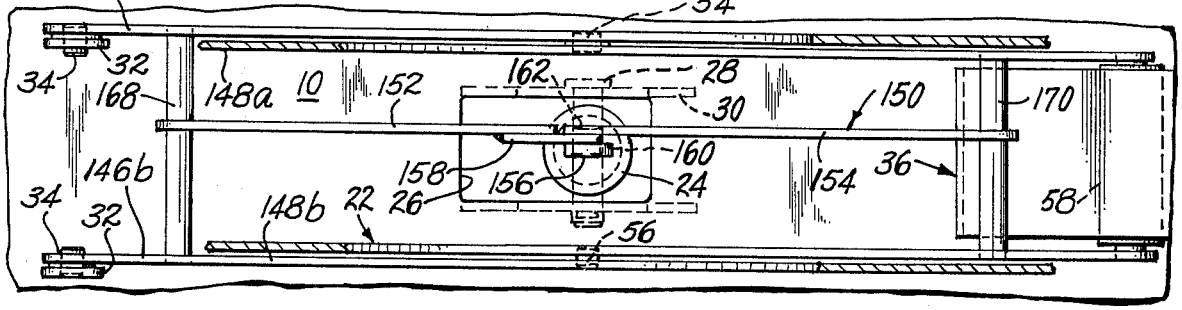
FIG. 7 is a fragmentary vertical sectional view, taken on the staggered section line 7—7 of FIG. 6.

Referring now to FIGS. 6 and 7, there is shown therein a second embodiment of the invention, utilizing a somewhat simpler bridge means construction that will still accommodate the twin goals of applying equal force simultaneously to the base legs of a lazy-tongs, while at the same time accommodating the scissors-like movements thereof. In FIGS. 6 and 7 elements identical to those in FIGS. 1-5 bear identical reference numerals.

The lazy-tongs assembly 22' of FIGS. 6 and 7 is mounted to the base plate 10 and the scraper blade 14 in the same manner as in FIGS. 1-5, and is otherwise identical to the lazy-tongs assembly 22 except for the base legs 146a and 146b, and 148a and 148b thereof, which differ from the base legs 46a, 46b, 48a and 48 b only in how and where the bridge means 150 of FIGS. 6 and 7 is connected thereto.

The bridge means 150 comprises an articulated bridge element, consisting of a pair of bridge arms 152 and 154 connected at their outer ends by a pivot pin 156. The two bridge arms 152 and 154 are substantially equal in length and lie in the same plane, and the bridge arm 152 has an offset extension plate 158 thereon which overlaps the mating end of the arm 154, said mating end and the extension plate 156 having aligned bores 160 and 162 therethrough, respectively, for receiving the pivot pin 156. The pivot pin 156 is of sufficient length to also connect the outer end of the piston rod 76 to the articualted bridge element 150.

The outer ends of the bridge arms 152 and 154 have cylindrical bores 164 and 166, respectively, therein. The outer end of the bridge arm 152 is connected to the superimposed base legs 146a and 146b of the lazy-tong assembly 22' by a transverse pivot shaft 168 extending between said base legs and passing through the bore 164. The pivot shaft 168 is spaced from the mounting ends of the superimposed base legs 146a and 146b a distance equal to about one-quarter the distance between the pivot pins 34 and the scissors pivot pins 54 and 56. Similarly, the outer end of the bridge arm 154 is mounted on a pivot shaft 170 extending transversely between the superimposed base legs 148a and 148b, and which passes through the bore 166, the pivot shaft 170 also being positioned about one-quarter the distance from the pivot shaft 58 to the scissors pivot pins 54 and 56.

As shown in FIG. 6, the bridge arms 152 and 154 have a length sufficient so that when the lazy-tongs assembly 22' is in its fully collapsed position, they define a shallow V-shape, with the point of the V carrying the pivot pin 156 extending toward the scraper blade. As a result, when the hydraulic cylinder 24 is activated to move the power piston 76 outwardly, the bridge arms 152 and 154 will be pulled outwardly therewith, placing a simultaneous and equal force on the two superimposed sets of base legs of the lazy-tongs assembly 22' that tends to close the scissors formed thereby. In operation, as the power piston 76 moves outwardly the bridge arms 152 and 154 of the articulated bridge element 150 will be effective to move the pivot shaft 58 toward the fixed pivot pins 34, thereby extending the lazy-tongs assembly. As this occurs, the articulated bridge element 150 will absorb the converging scissors-like movement of the base legs, shifting the pivot pin 156 laterally, a movement that is readily accommodated because the hydraulic piston 24 is pivotally mounted at both ends thereof. The articulated bridge element remains effective during the extension of the lazy-tongs 22' to exert simultaneous and substantially equal force on both superimposed pairs of base legs, and upon retraction of the power piston 76 will be effective to collapse the lazy-tongs assembly.

In both embodiments of the invention, the bridge means is positioned midway between the parallel, superimposed base legs of the lazy-tongs, an arrangement that in effect creates four spaced points of force application to the scraper blade 14, the bridge means functioning so that pressure is simultaneously and substantially equally applied at each of the four points. While the use of two parallel sets of lazy-tongs in this manner gives balance to the system, it is of course to be understood that if desired only one set of lazy-tongs can be utilized with either of the bridge elements of the invention.

The choice as to which embodiment of the bridge means to employ can be influenced by several factors. Generally, the rigid bridge element 80 is subjected to substantial bending movements, and thus may not be suited to extremely heavy loading. The articulated bridge element 150, on the other hand, acts only in tension and compression, which is well suited to heavy loads. However, the articulated bridge element 150 may require a lengthier power piston stroke, depending upon the design requirements. In all instances, it has been found that the two bridge embodiments of the invention make more efficient use of the power of a hydraulic cylinder than prior lazy-tongs arrangement like those shown in the patents cited herein, making it possible to use lower hydraulic pressures and lighter hydraulic equipment.

It is to be understood that the points of connection of the bridge elements with the mounting end portions of the base legs can be varied somewhat, again depending on design characteristics. Obviously, many other modifications and variations of the invention are possible.

I claim:

1. A power actuated lazy-tongs arrangement, comprising: lazy-tongs means, including a pair of base leg means; relatively fixed base means; bracket means connecting the mounting ends of said base leg means with said base means, and arranged to provide for scissors-like movements of said base leg means; bridge means connected to extend between said base leg means, and arranged to accommodate said scissors-like movements, said bridge means including a rigid bridge element, one end of said rigid bridge element being connected with one of said base leg means by a fixed pivot arrangement, and the other end of said rigid bridge element being connected to the other of said base leg means by a fixture providing for both pivotal and sliding movement between said bridge element and said other base leg means; and power piston means connected to the central portion of said bridge means, and operable to apply force thereto for extending and collapsing said lazy-tongs means, said bridge means being effective to apply such force substantially simultaneously and equally to both of said base leg means.

2. A power actuated lazy-tongs arrangement as recited in claim 1, wherein said power piston means comprises: a hydraulic cylinder including a power piston, one end of said hydraulic cylinder being pivotally connected with said fixed base means, and the other end thereof being pivotally connected with said bridge means.

3. A power actuated lazy-tongs arrangement as recited in claim 1, wherein said lazy-tongs means comprises a pair of spaced, parallel, superimposed lazy-tongs, and wherein said bridge means is disposed between said pair of superimposed lazy-tongs.

4. A power actuated lazy-tongs arrangement as recited in claim 3, wherein said bridge means is connected to the portions of said base leg means extending between said bracket means and the scissors pivot connection of said leg means.

5. A power actuated lazy-tongs arrangement as recited in claim 1, wherein said bracket means includes: first bracket means on said base means, and including a fixed pivot pin for connecting the mounting end of one of said base leg means thereto; second bracket means on said base means spaced from said first bracket means, and including a slot having its axis in general alignment with said fixed pivot pin; and a pivot shaft carried within said slot, for connecting the mounting end of the other of said base leg means to said second bracket means.

6. A power actuated lazy-tongs arrangement comprising: lazy-tongs means, including a pair of base leg means connected to each other for scissors-like movements; relatively fixed base means; bracket means on said base means for connecting the mounting ends of said base leg means thereto, and arranged to provide for said scissors-like movements; a rigid bridge element; fixed pivot pin means on one of said base leg means between the mounting end thereof and the scissors pivot connection between said base leg means, for pivotally connecting one end of said rigid bridge element thereto; slidable pivot pin means on the other of said base leg means between the mounting end thereof and the scissors pivot connection between said base leg means, for slidably and pivotally connecting the other end of said rigid bridge element thereto; and power piston means connected with the central portion of said rigid bridge element for exerting force thereon, said rigid bridge element being effective to transmit said force substantially simultaneously and equally to said pair of base leg means for operating said lazy-tongs means.

7. A power actuated lazy-tongs arrangement as recited in claim 6, wherein said power piston means is pivotally mounted at one end thereof to said fixed base means, and is pivotally mounted at the other end thereof to said rigid bridge element.

8. A power actuated lazy-tongs arrangement as recited in claim 7, wherein said lazy-tongs means comprises a pair of spaced, parallel, superimposed lazy-tongs, and wherein said rigid bridge element is mounted to operate in a plane midway between the planes containing said spaced lazy-tongs.

9. A power actuated lazy-tongs arrangement as recited in claim 6, wherein said rigid bridge member is generally in the configuration of a U, with the base of the U extending in the direction of the extending movement of said lazy-tongs.

10. A power actuated lazy-tongs arrangement, comprising: lazy-tongs means, including a pair of base leg means connected to each other for scissors-like movements; relatively fixed base means; bracket on said base means for connecting the mounting ends of said base leg means thereto, and arranged to provide for said scissors-like movements; and articulated bridge element; fixed pivot pin means on each of said base leg means between the mounting ends thereof and the scissors pivot connection between said base leg means, for pivotally connecting the opposite ends of said articulated bridge element to said base leg means to extend therebetween; and power piston means connected with said bridge element at the articulation therein for exerting force thereon, said power piston means being pivotally mounted at one end thereof to said fixed base means, and pivotally mounted at the other end thereof to said articulated bridge element, said articulate bridge element being effective to transmit said force substantially simultaneously and equally to said pair of base leg means for operating said lazy-tongs means.

11. A power actuated lazy-tongs arrangement as recited in claim 10, wherein said articulated bridge element comprises a pair of bridge arms of substantially equal length connected by pivot pin means that also serves to connect said power piston means with said bridge element, said bridge arms being of such length and being so arranged that when said lazy-tongs means is in a collapsed condition said bridge arms define generally a V, the point of said V extending in the direction of the extending movement of said lazy-tongs.

12. A power actuated lazy-tongs arrangement as recited in claim 11, wherein said lazy-tongs means comprises a pair of spaced, parallel, superimposed lazy tongs, and wherein said bridge arms lie in a common plane that is positioned midway between the planes containing said spaced lazy-tongs.

* * * * *